United States Patent
Scholz et al.

(10) Patent No.: US 8,678,676 B2
(45) Date of Patent: Mar. 25, 2014

(54) TILT SHIFT LENS ADAPTER

(76) Inventors: Erwin Scholz, Miramar, FL (US);
Wilfried Aloie Anton Bittner, Tsing Yi (HK); J. Brian Caldwell, Petersburg, VA (US)

(*) Notice: Subject to any disclaimer, the term of this patent is extended or adjusted under 35 U.S.C. 154(b) by 81 days.

(21) Appl. No.: 13/200,129

(22) Filed: Sep. 19, 2011

(65) Prior Publication Data
US 2012/0070141 A1    Mar. 22, 2012

Related U.S. Application Data

(60) Provisional application No. 61/383,759, filed on Sep. 17, 2011.

(51) Int. Cl.
*G03B 13/00* (2006.01)

(52) U.S. Cl.
USPC .......................................................... 396/342

(58) Field of Classification Search
USPC .......................................................... 396/342
See application file for complete search history.

(56) References Cited

U.S. PATENT DOCUMENTS

| | | | |
|---|---|---|---|
| 3,589,260 A | 6/1971 | Ferra | |
| 4,229,094 A | 10/1980 | Baab et al. | |
| 5,053,794 A | 10/1991 | Benz | |
| 5,289,215 A | 2/1994 | Clairmont et al. | |
| 5,592,331 A * | 1/1997 | Eastcott | 359/554 |
| 6,318,912 B1 * | 11/2001 | Shono et al. | 396/342 |
| 6,416,240 B1 * | 7/2002 | Johnson | 396/505 |
| 6,717,727 B2 | 4/2004 | Barziza | |
| 7,064,789 B1 | 6/2006 | Shono | |
| 7,079,332 B2 | 7/2006 | Tanaka | |
| 7,085,491 B2 | 8/2006 | Chiang | |
| 7,178,997 B2 | 2/2007 | Becker et al. | |
| 7,369,332 B2 | 5/2008 | Schletterer | |
| 7,800,680 B2 | 9/2010 | Strong | |
| 8,075,201 B2 | 12/2011 | Mays et al. | |
| 8,289,436 B2 | 10/2012 | Strong | |
| 2003/0210479 A1 * | 11/2003 | Watanabe et al. | 359/823 |
| 2005/0163494 A1 * | 7/2005 | Fukumoto et al. | 396/71 |
| 2010/0150541 A1 * | 6/2010 | Strong et al. | 396/342 |
| 2013/0208368 A1 | 8/2013 | Strong et al. | |

OTHER PUBLICATIONS

Specification Data Sheet for Hasselblad HTS 1.5 Tilt and Shift Adapter from www.hasselblad.com.
Ganzel, Peter, information from review of Myrex N645-M42 Tilt and Shift Adapter posted on Aug. 5, 2009 at www.dyxum.com.

* cited by examiner

*Primary Examiner* — Clayton E Laballe
*Assistant Examiner* — Dennis Hancock
(74) *Attorney, Agent, or Firm* — Opticus IP Law PLLC

(57) ABSTRACT

A tilt shift lens adapter having an adapter body with first and second body portions configured to provide precision tilting and shifting functions is disclosed. Opposite sides of the adapter body are configured to respectively engage a camera and a lens. Tilting and shifting are precisely controlled using precision tilting and shifting mechanisms. The tilting mechanism includes a neutral setting for ensuring precise parallelism between the lens and camera flanges when required. The adapter includes a mount to provide good balance and holding strength when heavy lenses are attached. An optional aperture adjustment mechanism manually adjusts lenses having no aperture ring.

20 Claims, 17 Drawing Sheets

TILT SHIFT LENS ADAPTER

CLAIM OF PRIORITY

This Application claims the benefit of priority under 35 USC §119(e) of U.S. Provisional Patent Application Ser. No. 61/383,759, entitled "Tilt shift lens adapter," filed on Sep. 17, 2011, and which is incorporated by reference herein.

FIELD

The present disclosure relates to lens-to-camera mount adapters, and more specifically relates to adapters that offer both tilting and shifting functions.

BACKGROUND ART

Lens-to-camera mount adapters are used to attach a lens having a relatively large flange distance to a camera having a shorter flange distance. Adding a tilt function to such an adapter will allow a photographer to adjust the plane of focus to meet the Scheimpflug condition in order to increase depth of field, or alternately to intentionally violate the Scheimpflug condition in order to reduce the depth of field. Adding a shift function to a lens adapter will permit, among other things, the sensor plane to remain parallel to a wall or building while still taking in the full height of the subject. This will allow vertical lines in the object to be perfectly vertical in the image.

In order to take full advantage of tilting and shifting capability, the lens should have an image circle that is substantially larger in diameter than the actual image diagonal. So, for example, if a four-thirds format camera is used that has an image diagonal of 21.6 mm, it will be necessary to use a lens designed for a larger format, such as the DX format (28.8 mm image circle) or FX format (43.2 mm image circle).

It is also important that the flange distance (i.e. the distance from the lens mounting flange to the image surface) of the lens is substantially larger than the flange distance of the camera. The space between the two flanges will be filled with the lens-to-camera mount adapter, and the space needs to be adequately large to incorporate both tilting and shifting mechanisms.

Recently, cameras having a very short flange distance while also having a fairly large sensor (either four-thirds or DX) have become very popular. These are sometimes called "mirrorless" cameras because they use an electronic viewfinder rather than a single lens reflex viewing system. Elimination of the SLR type viewfinding system is what permits these cameras to have such a short flange distance. Examples of mirrorless cameras include the Sony NEX series of cameras, the Olympus series of Micro Four Thirds cameras, the Panasonic series of Micro Four Thirds cameras, and the Samsung NX series of cameras.

Many lens-to-camera mount adapters have been developed specifically for mirrorless cameras, ranging from simple adapters in which the camera and lens mounts are rigidly fixed with respect to each other, to adapters that permit either tilting or shifting. Currently there are no such adapters that permit both tilting and shifting.

One common problem with mirrorless cameras is that they are too small to provide a tripod mount that is sufficiently robust to support the camera when a large lens is attached. A lens-to-camera mount adapter is an ideal place to locate a robust tripod mount because the mounting location is closer to the center of gravity of the camera-plus-lens system. Also, the size and shape of a tripod mount located on a lens-to-camera mount adapter is not limited by the size and shape of the camera body. This means that the mount adapter can incorporate a quick-release tripod foot compatible with standard tripod heads such as Arca Swiss or Manfrotto. Currently, however, there are no such lens-to-camera mount adapters providing a robust tripod mount.

Many current lenses that would otherwise be ideal for mounting to mirrorless cameras via an adapter lack manual control of the iris diaphram. An excellent example are the "G" type lenses manufactured by Nikon. These lenses have no aperture ring. However, Nikon G lenses do have a mechanical aperture linkage in the mounting flange that can be controlled by a properly designed lens-to-camera mount adapter. Currently there are a variety of lens-to-camera mount adapters that provide manual control of lenses lacking manual iris control, but none of these adapters also provide both tilting and shifting functions.

SUMMARY

In view of the above, there is a need for a lens-to-camera mount adapter with both tilting and shifting functions. In addition, there is a need for such an adapter in which the tilt and shift functions are precisely controlled by means of lead screws or the like. In addition, there is a need for such an adapter to have a means for direct attachment to a tripod or similar support. There is also additionally a need for such an adapter to have a means for manually controlling the aperture for certain attached lenses which lack a manual aperture control means such as an aperture ring.

The present disclosure is thus directed to a lens-to-camera mount adapter that permits both tilting and shifting of the lens relative to the camera body. More specifically, the disclosure is directed to a tilt/shift adapter ("tilt shift adapter") suitable for use with short-flange-distance mirrorless cameras coupled with conventional long-working distance lenses designed for SLR type cameras. The tilting and shifting functions of the adapter disclosed herein are actuated by precision tiling and shifting mechanisms. In an example embodiment, a tripod mount is built-in to the adapter both to achieve better balance when a large lens is attached and also to avoid relying on the camera's tripod mount, which may not be sufficiently strong. The adapter also optionally includes a manual aperture lever to engage and control the iris mechanism of lenses that lack an aperture ring, such as the aforementioned Nikkor G-type lenses by Nikon.

Accordingly, an aspect of the disclosure includes a tilt shift adapter for attaching a lens to a camera. The adapter has an adapter body having an aperture and a first body portion with a first side configured to attach the camera and second body portion with a second side configured to attach the lens. The first and second body portions can move relative to one another to create a tilt and a shift relative to the first and second sides. A a precision shifting mechanism is operably configured to control and set an amount of said shift while a precision tilting mechanism operably configured to control and set an amount of said tilt.

Another aspect of the disclosure is a tilt shift adapter for attaching a lens to a camera. The adapter includes an adapter body with an aperture and having a first portion with a first side configured to operatively engage the camera and a second portion with a second side configured to operatively engage the lens. The first and second adapter body portions are configured to be shiftable and tiltable relative to one another via respective shifting and tilting mechanisms operatively arranged with the adapter body portions. The adapter also includes a mount configured to attach the adapter body to an adapter body support.

DETAILED DESCRIPTION

Figure 1:
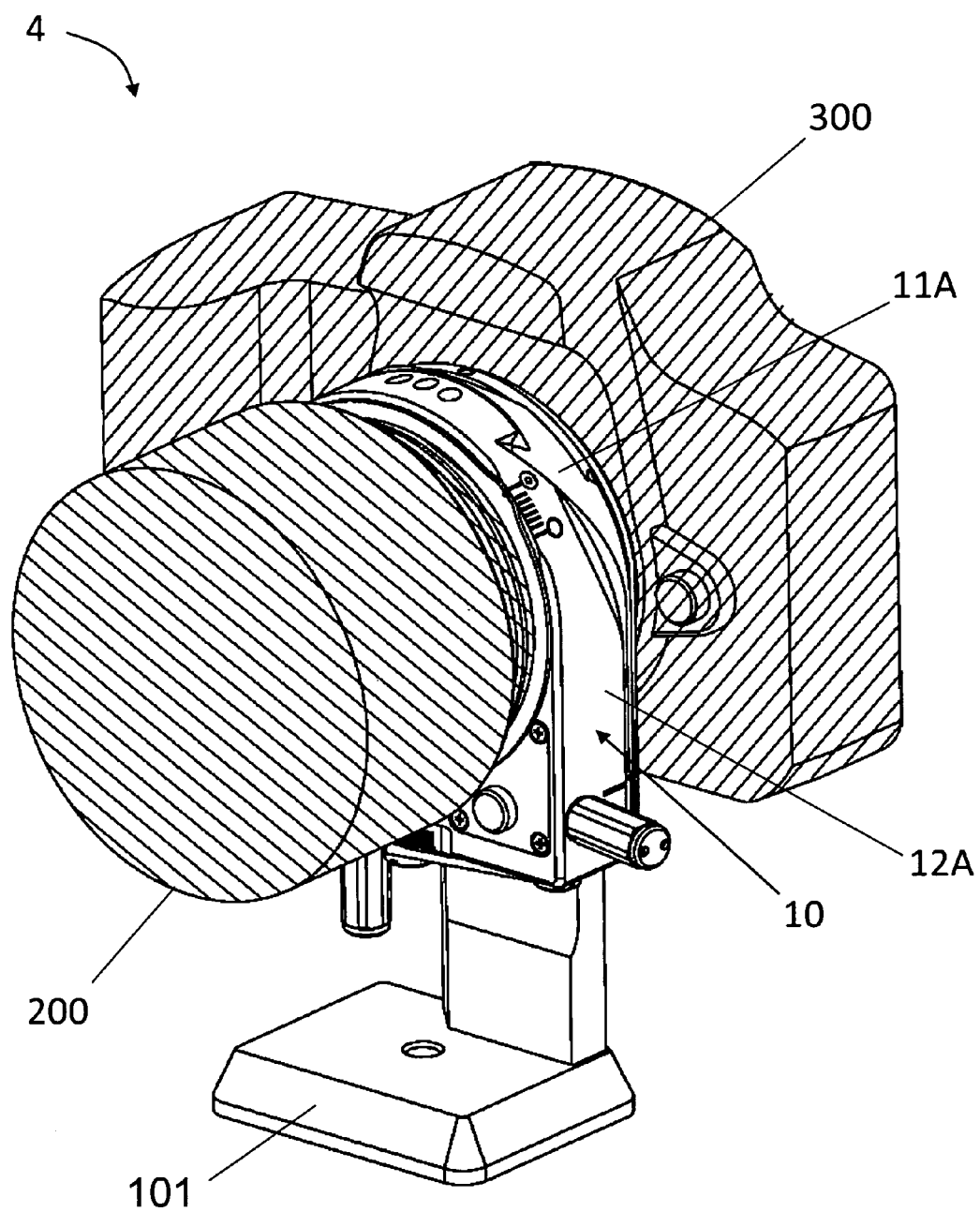
FIG. 1 is a front elevated view of an example embodiment of an assembly formed by the tilt shift adapter, the lens and the camera, with both lens and camera attached in the landscape position.

The present disclosure is directed to lens-to-camera mount adapters that permit both tilting and shifting, and more specifically is directed to such adapters suitable for use with short flange distance mirrorless cameras coupled with conventional long-working distance lenses designed for SLR type cameras. The lens-to camera mount adapter disclosed herein is referred to as a "tilt shift adapter" or just "adapter" for short.

The combination of a tilt shift adapter and at least one of a lens and a camera is called an "assembly" and is identified by reference number 4.

With reference to FIGS. 1, 7, 10 and 13, an exemplary adapter 10 is shown as part of an assembly 4. Adapter 10 includes a first body portion 11 with a first side 11A configured to operably engage a camera 300 and a second body portion 12 with a second side 12A configured to operably engage a lens 200. An aperture 16 in body portions 11 and 12 allows the passage of light from lens 200 attached to the second side 12A to camera 300 attached to the first side 11A. An example adapter 10 has a rounded top 13 with generally parallel edges 22 when viewed face on.

First and second body portions are engaged so that they can move relatively to one another to create a tilt and a shift relative to first side 11A and second side 12 (i.e., between the first and second sides). As described below, the amount of tilting and the amount of shifting can be precisely controlled by tilt adjustment screws 109 and shift adjustment screws 108.

Example first and second sides 11A and 12A are respectively configured with standard camera-engaging and lens-engaging devices 124 and 115 respectively, as is used in the art. An exemplary engagement device is a bayonet mount. Threads can also be used. The exact size and shape of the aperture 16 depends on the requirements and specifications of the engagement devices 124 and 115, respectively.

The first and second sides 11A and 12A include respective first and second flanges 124 and 115 that respectively engage camera and lens flanges of camera 300 and lens 200 being operably coupled to the adapter. The first and second flanges 124 and 115 are also called the camera flange and the lens flange, respectively. The first and second flanges 124 and 115 can be tilted and shifted with respect to one another by tilting and shifting the first and second body portions 11 and 12, respectively.

The tilting and shifting motions are constrained by cylindrical and planar dovetail bearings 117 and 110. In both cases, play in the dovetail bearings 117 and 110 is eliminated by tilt movement adjustment screws 109 and shift movement adjustment screws 108, respectively. Adjustment screws 108 and 109 are tipped with slide adjustment bearing material 145 to provide a smooth sliding friction.

The tilt and shift dovetail bearings 117 and 110 are independent from each other, meaning that the tilting and shifting motions can be carried out either separately or in combination. Both the tilt and shift motions are precisely controlled by the aforementioned precision tilting and shifting mechanisms that include in an example corresponding leadscrews 131 and 126, respectively, tipped with ergonomic knobs 105 and 106, respectively. The precision tilting and shifting mechanisms can be used to precisely set select amounts of tilt and shift.

The adapter 10 includes an extended body portion 14. The extended body portion 14 includes a side 14A that accommodates a spring-tensioned lock lever 118 (FIG. 6), whose function is explained below. The extended body portion 14 includes a bottom edge 15 to which is attached a mount 101, e.g., a mounting plate, that allows the adapter 10 to be mounted to an adapter body support 400, i.e., a support structure, such as a tripod (see FIG. 16). While mount 101 is sometimes referred to below as a "tripod mount," it is not limited to mounting to tripods. Mount 101 is shown attached to the bottom edge 15 of the extended body portion 14 using screws 149, by way of example.

In addition to tilt and shift motions, the adapter 10 features a rotation function so that the tilting and shifting can take place in different directions. This is accomplished by a precision rotation bearing 150 that lies between the first body portion 11 and the first flange 124. As mentioned above, the first flange 124 is configured to couple the adapter 10 to the camera 300, and so it remains fixed relative to the camera. By rotating the first flange 124 relative to the remainder of the adapter 10, the adapter is able to rotate relative to the camera 300. This allows the shifting and tilting motions to take place along either the landscape or portrait direction of the camera 300, or along at least one and preferably several intermediate angular positions.

Figure 6:
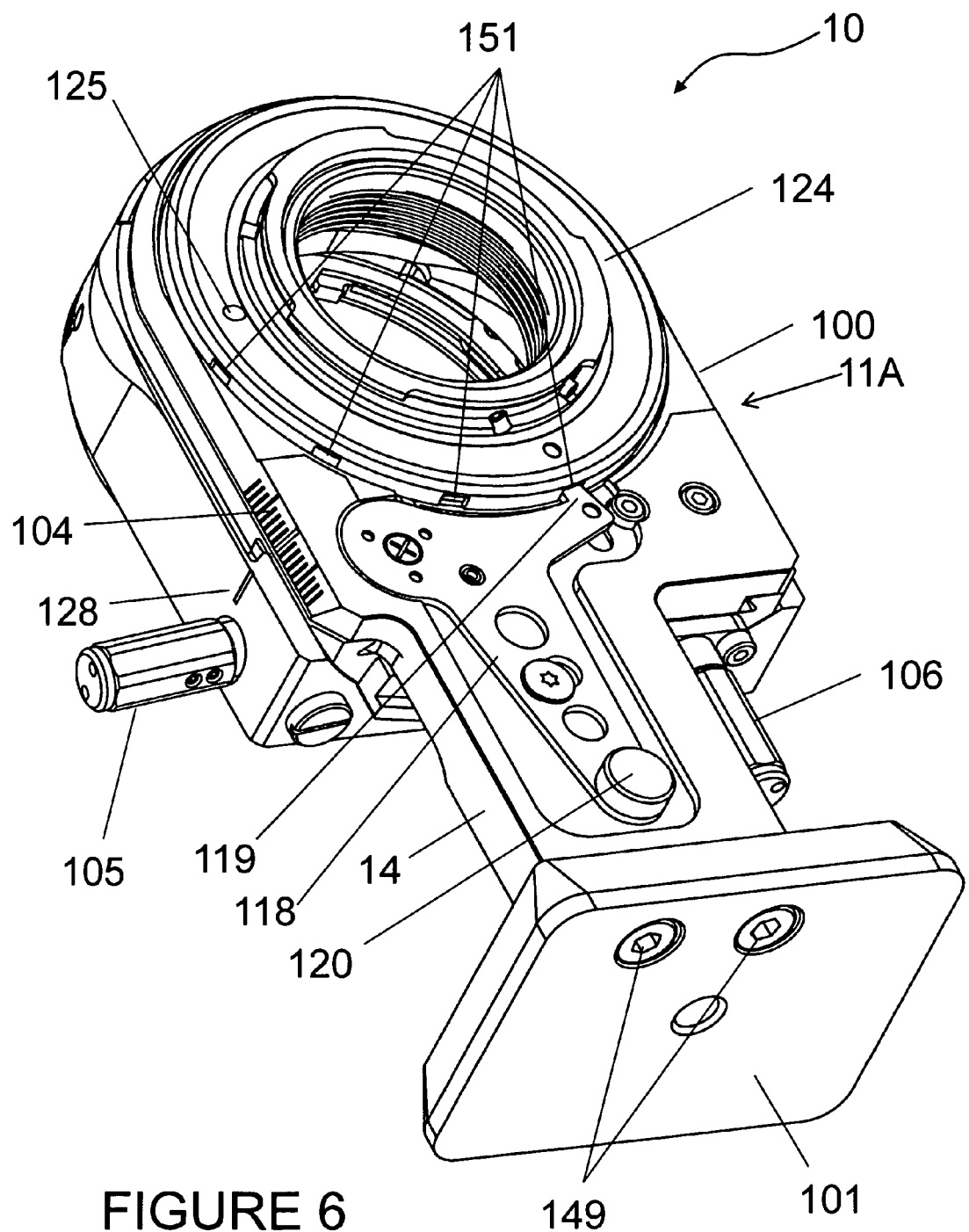
FIG. 6 is a bottom elevated view showing the camera side of tilt shift adapter and illustration various functions and controls related to adapter rotation.

In an example, the rotation is controlled by the aforementioned spring-tensioned lock lever 118 shown in FIG. 6. Rotation is locked by engaging the hooked end 119 of lock lever 118 with any of several corresponding holes 151 located along the outer edge of the first flange 124. In an example, the spacing of holes 151 permits angular rotation from zero to 90 degrees in angular increments, such as 30-degree increments.

In an embodiment, the adapter 10 has a maximum shift of +/−8 mm, a maximum tilt of +/−8 degrees, and a maximum rotation of 90 degrees to permit both portrait and landscape camera orientations. The adapter 10 includes bayonet rings 115 and 124 for attaching a lens 200 and a camera body 300, respectively. The tripod mount 101 is interchangeable to permit use with an arbitrary variety of tripod heads.

Figure 2A:
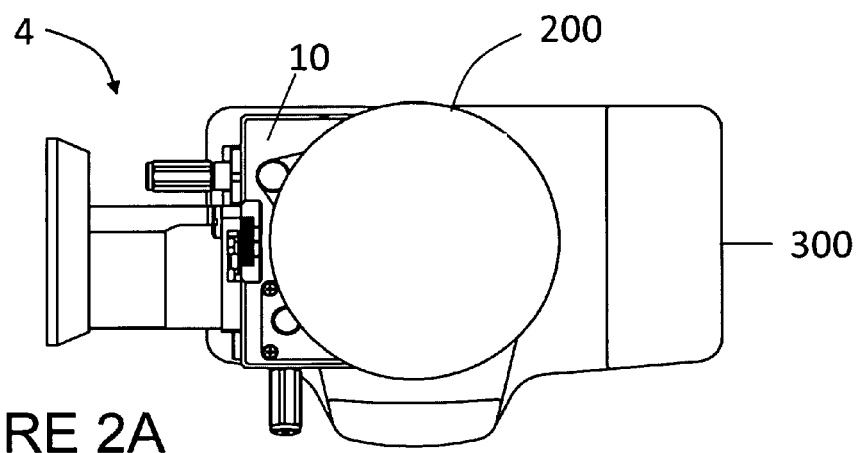
FIG. 2A through FIG. 2C are respective front, side and rear views showing an embodiment of the tilt shift adapter assembly, with both lens and camera attached in the portrait position.
Figure 2B:
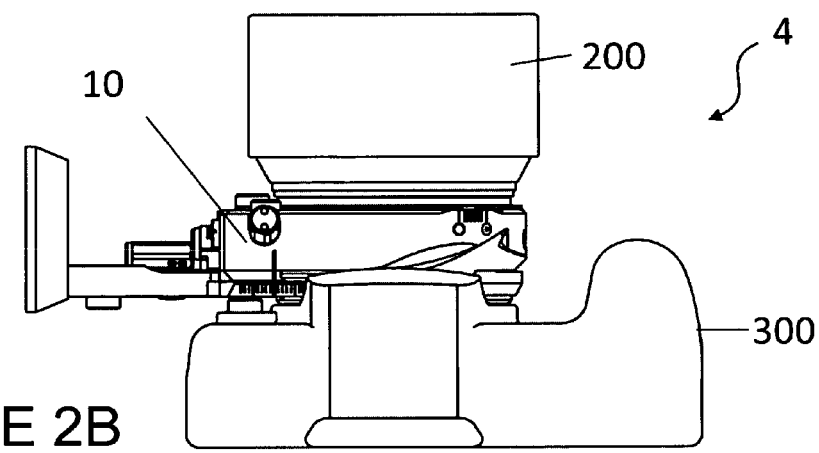
Figure 2C:
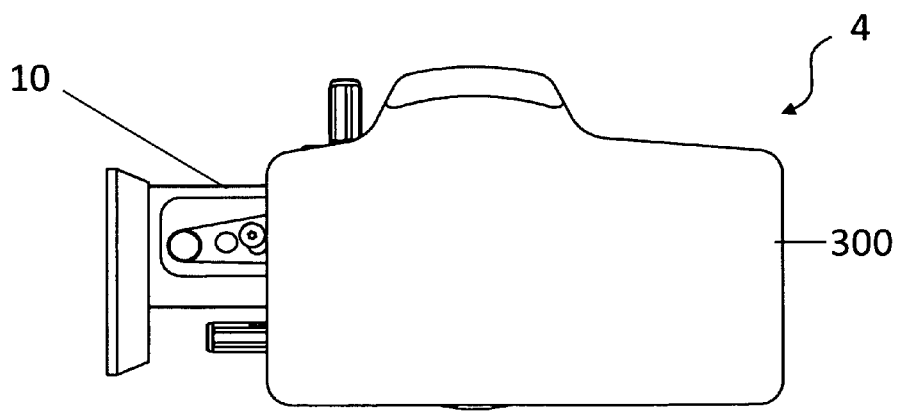

FIGS. 2A through 2C shows three elevation views (front, side and rear, respectively) of assembly 4 with camera and lens attached to tilt shift adapter 10 in the portrait orientation.

Figure 3:
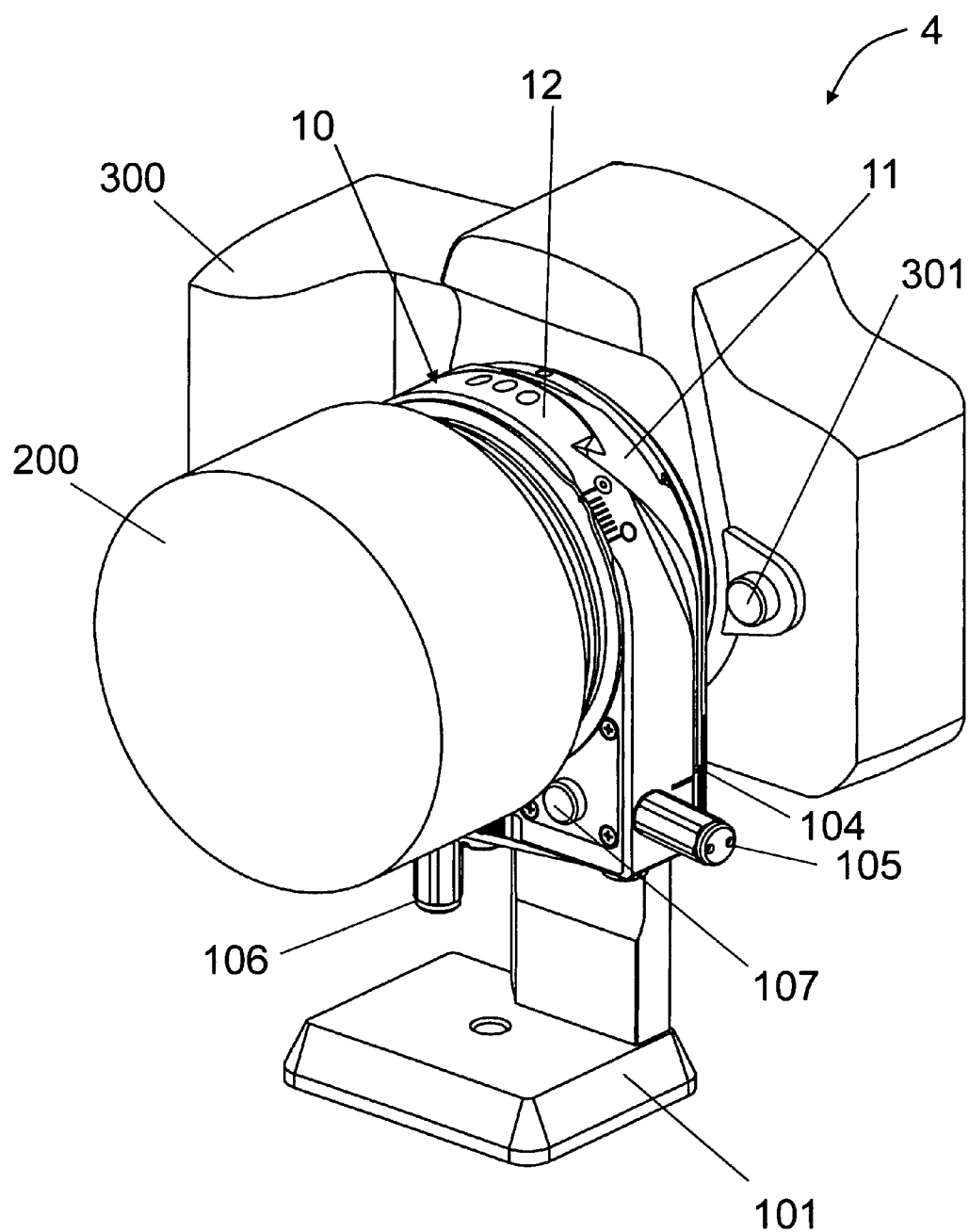
FIG. 3 is a front elevated view showing an embodiment of the tilt shift assembly with both lens and camera attached to the tilt shift adapter in the landscape position, with several functions labeled.

FIG. 3 shows a tilt drive knob 105 and a shift drive knob 106 that control the tilt and shift motions respectively. The aperture setting indicator 107 and shift scale 104 provide a visual indicator for the aperture value and degree of shift, respectively. The lens unlock button 107 is pressed to release the lens 200 to allow its removal. The camera-mounted lens unlock button 301 is normally used to release lenses attached to the camera 300, but in the present case it is used to release adapter 10.

Figure 4:
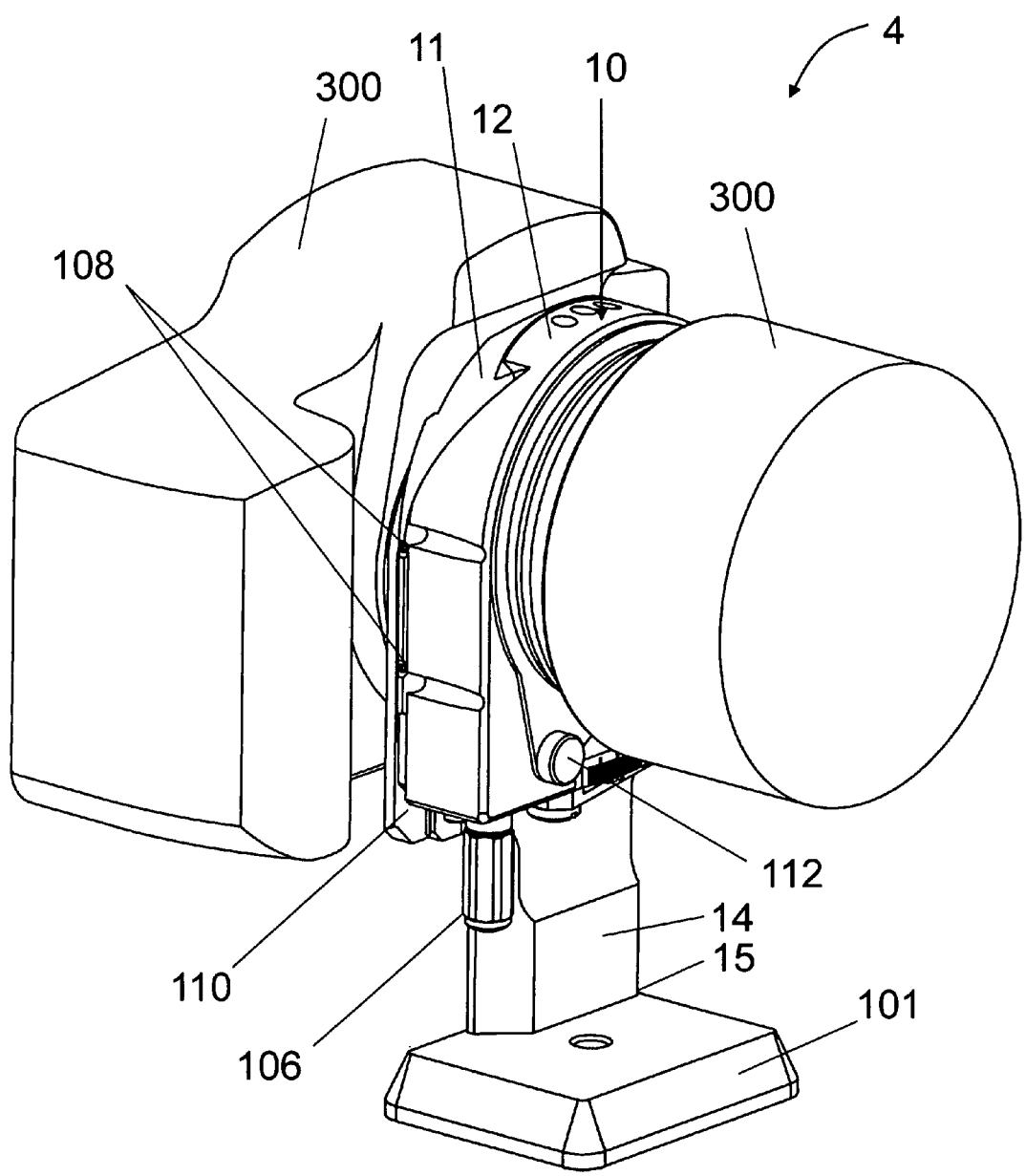
FIG. 4 is a side elevation view of the tilt shift assembly with both the lens and the camera attached to the tilt shift adapter in the landscape position, with additional functions and features labeled.

In FIG. 4, adjustment screws 108 are used to eliminate play in the shifting mechanism. The aperture set knob 112 is moved in a short arc to manually adjust the aperture of suitable lenses 200. This is particularly useful for Nikkor G type lenses (manufactured by Nikon Corporation), which have a mechanical iris control tab but lack an aperture control ring.

Figure 5:
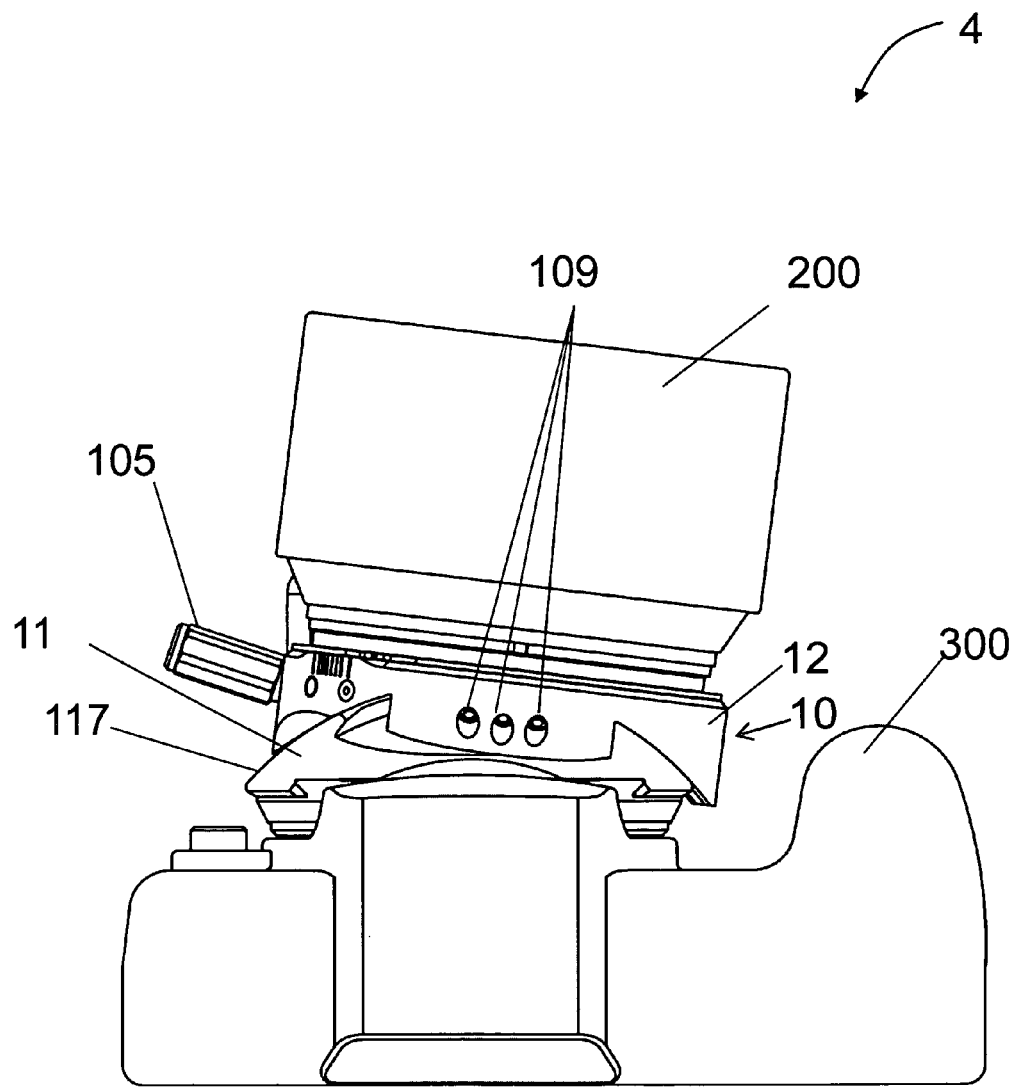
FIG. 5 is a drawing showing a top view of an embodiment of the present disclosure with both lens and camera attached in the landscape position with the tilt adjustment all the way in one direction, with several functions and features labeled.

In FIG. 5, the adapter 10 is shown in a maximum tilt configuration. The adjustment screws 109 are used to eliminate play in the tilting mechanism. The center of rotation of the tilt motion approximately coincides with the image plane. This ensures that there is little or no focus shift in the center of the image when the lens is tilted.

FIG. 6 illustrates features related to adapter rotation. This rotation is used to rotate the adapter 10 relative to the camera flange 124 of camera 300 so that the camera orientation can be switched from landscape to portrait orientation or vice versa. The spring-tensioned lock lever 118 allows controlled adapter rotation by engaging the camera flange 124 at holes 151 spaced at fixed angular increments my means of a hook 119. FIG. 6 also illustrates the screws 149 that are used to attach mount 101 to extended body portion 14.

Figure 7:
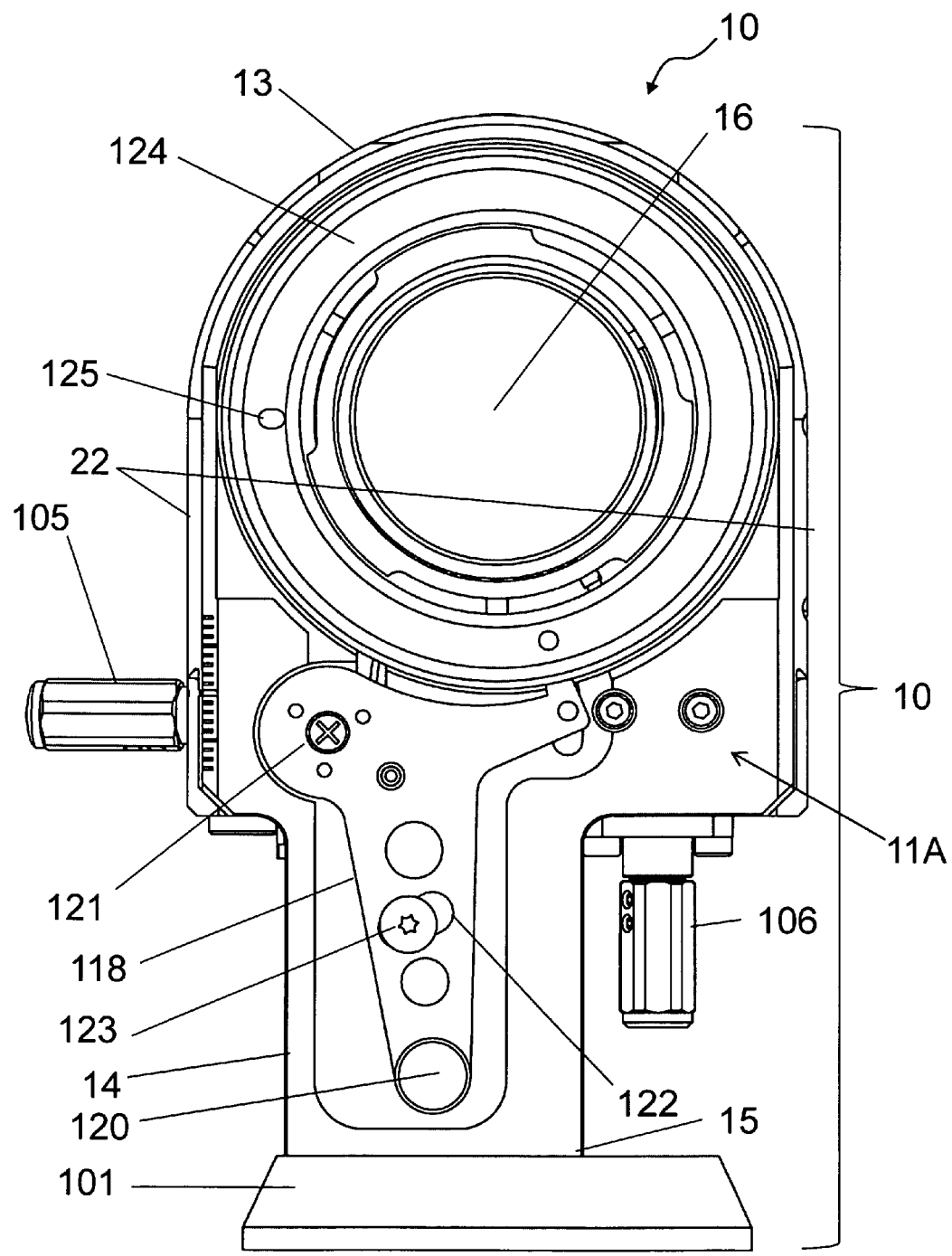
FIG. 7 is a face-on camera-side view of an embodiment of the tilt shift adapter showing additional functions and controls related to adapter rotation.

FIG. 7 illustrates additional features related to adapter rotation. In FIG. 7, the camera's lens locking pin 302, which is analgous to the lens locking pin 116 on the adapter, engages with the hole 125 in the camera flange 124 to allow precise adapter rotation while keeping the bayonet ring rigidly fixed to the camera. The oblong slot 122 in the spring-tensioned lock lever 118 allows the lever to rotate about the bearing 121 while the bearing screw 123 prevents the lever from lifting up out of its plane of rotation. The spring-tensioned lock lever 118 is actuated by grasping the lock lever knob 120 and moving it to-and-fro.

Figure 8:
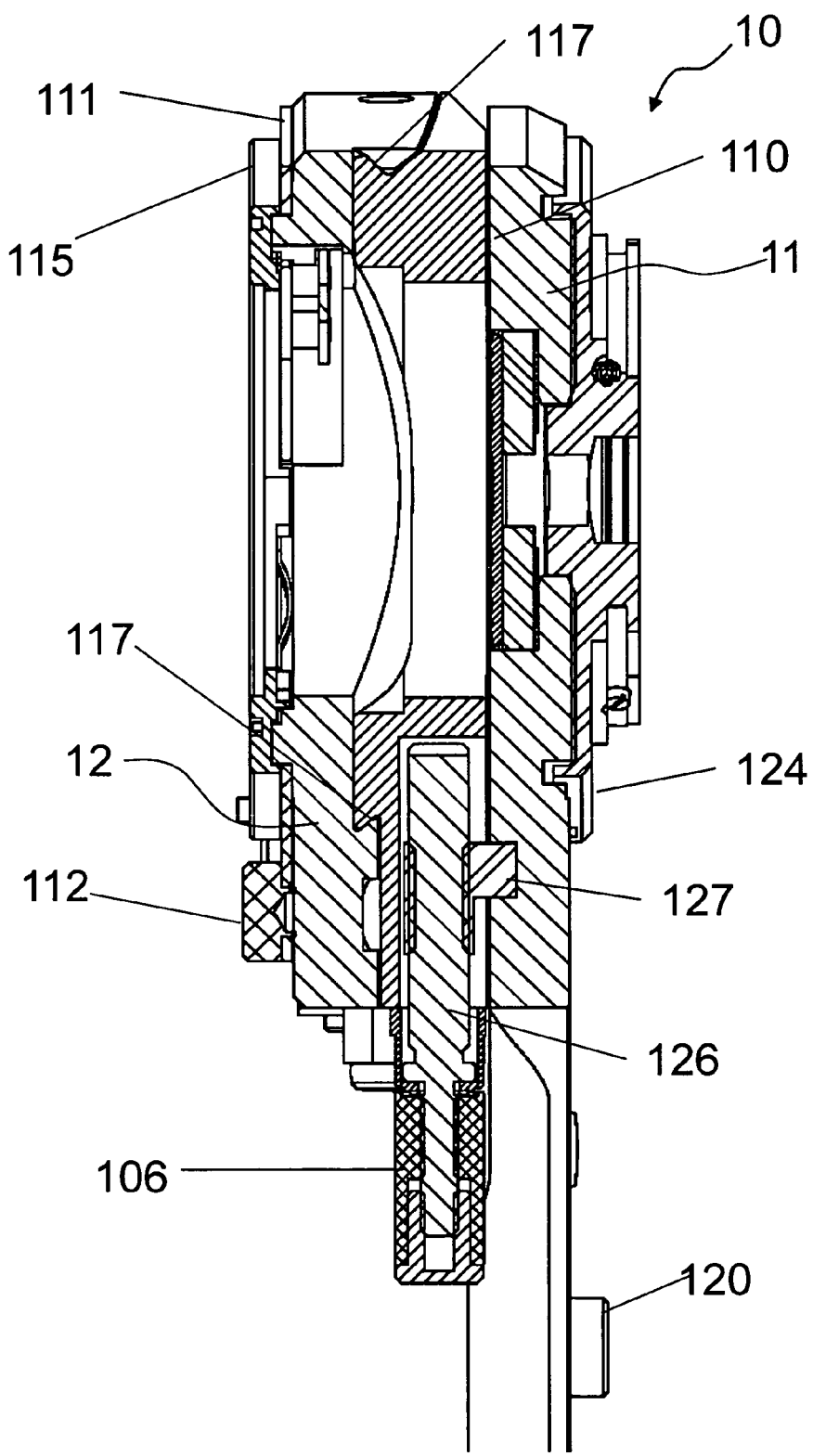
FIG. 8 is a cross-sectional view of an embodiment of the tilt shift adapter showing details of various mechanisms.

FIG. 8 is a cross-sectional view of the adapter that illustrates several mechanisms and features of an embodiment of the present invention including the aperture drive ring 111, the aperture drive knob 112, the shift drive knob 106, the shift movment lead screw 126, the shift movement drive nut 127, and dovetail tilt 117 and shift 110 guides.

Figure 9:
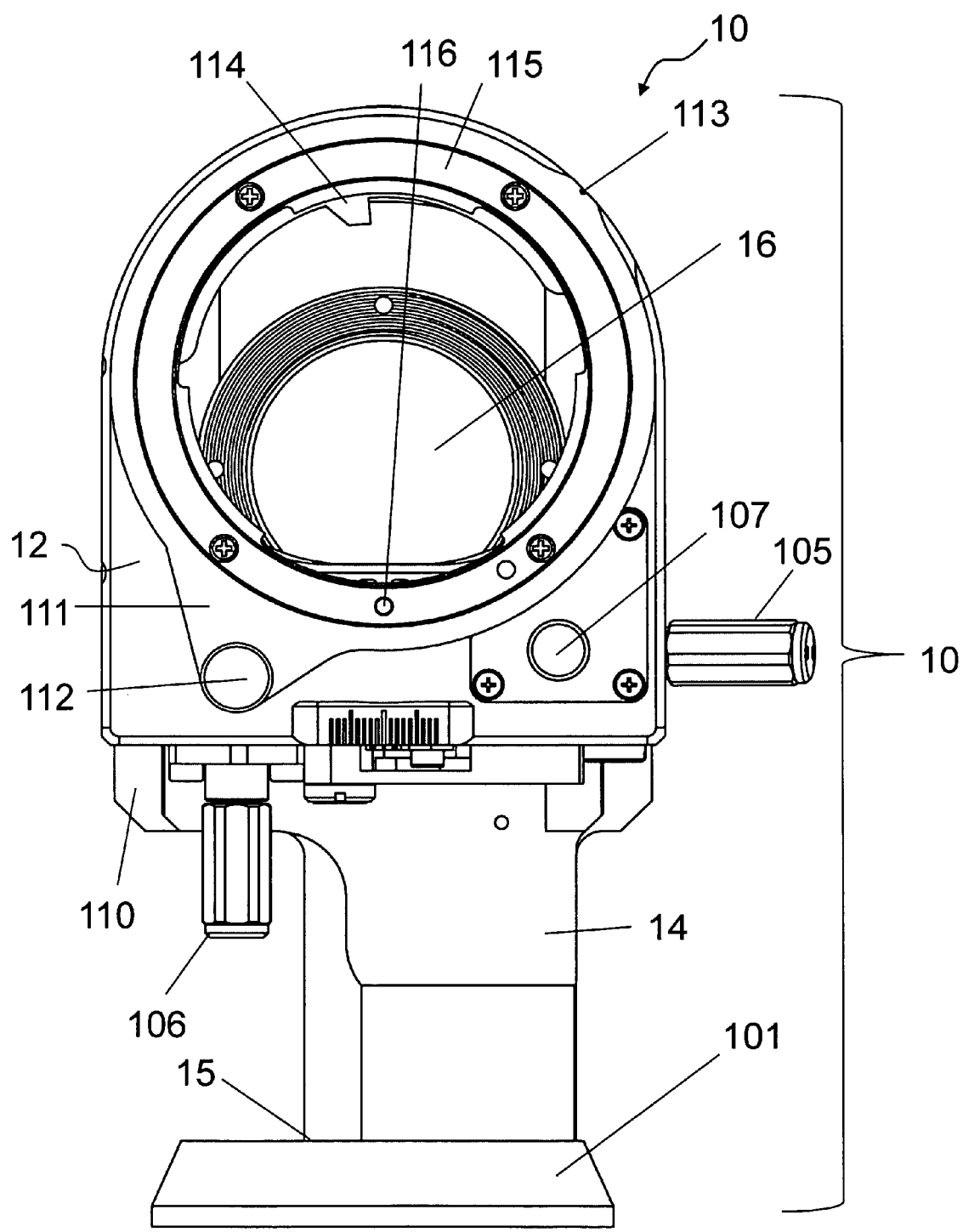
FIG. 9 is a face-on lens-side view of an embodiment of the tilt shift adapter several functions and controls related to lens aperture control.

FIG. 9 is an elevation view of side 12A shown when the lens flange 115 is shifted to its maximum vertical position. Several mechanisms and features are illustrated, including an aperture indicator 113, a lens locking pin 116, a lens locking pin retractor button 107, the shift drive knob 106, the tilt drive knob 105, a portion of the dovetail shift gude 110, the aperture drive ring 111, the aperture drive knob 112, and the lens engagement hook of the aperture drive, 114.

Figure 10:
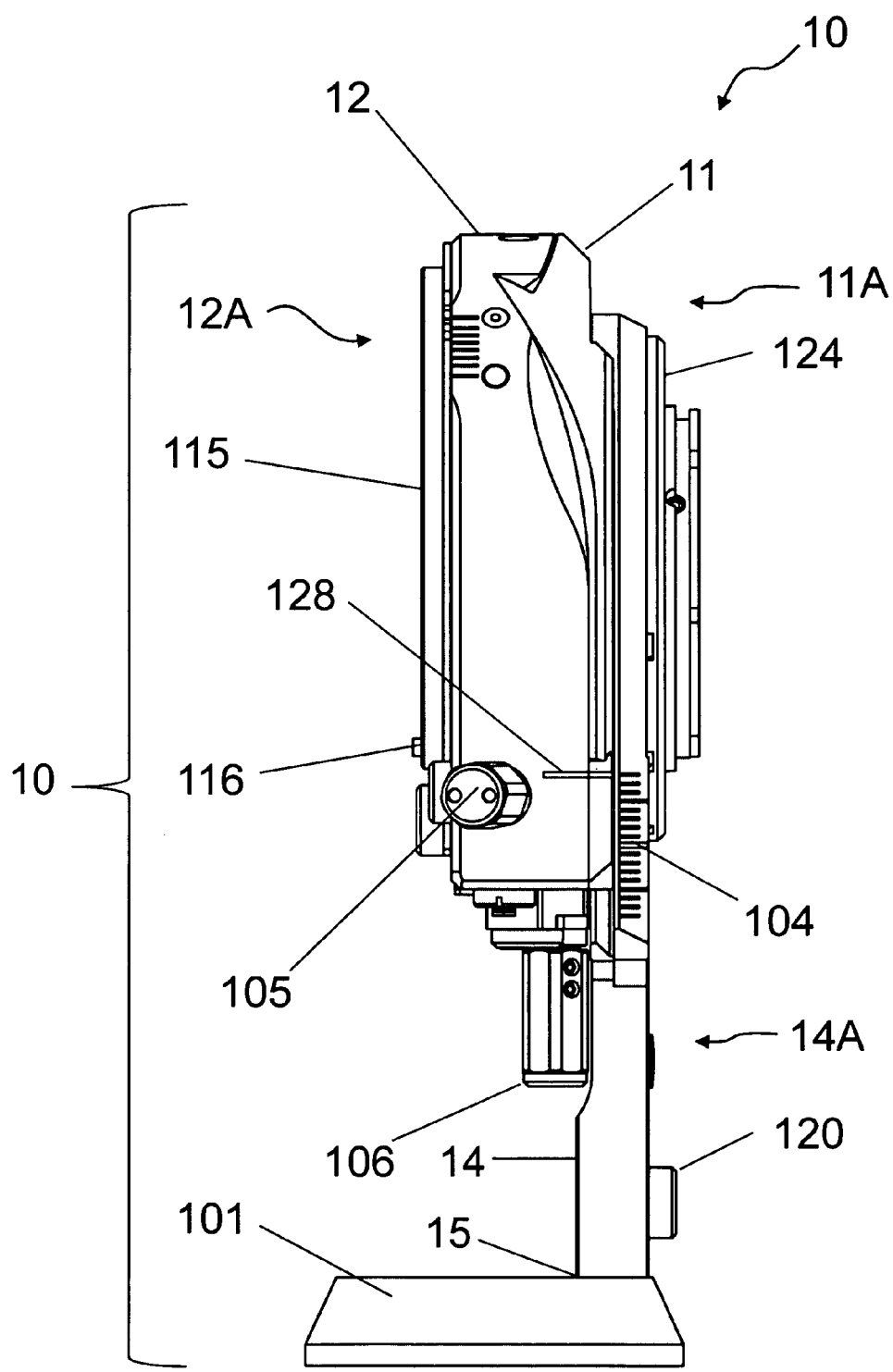
FIG. 10 is a side view of an embodiment of the tilt shift adapter showing index markings for the shifting mechanism.

FIG. 10 is a side view showing the shift indicator line 128, the shift index scale 104, the first body portion 11, the first side 11A, the second body portion 12, the second side 12A, the first flange 124, the second flange 115, the lens locking pin 116, the tilt drive knob 105, the shift drive knob 106, the extended body portion 14, the side 14A that accommodates a spring-tensioned lock lever 118 with lock lever knob 120, and the bottom edge 15 of the extended body portion to which mount 101 is attached.

Figure 11:
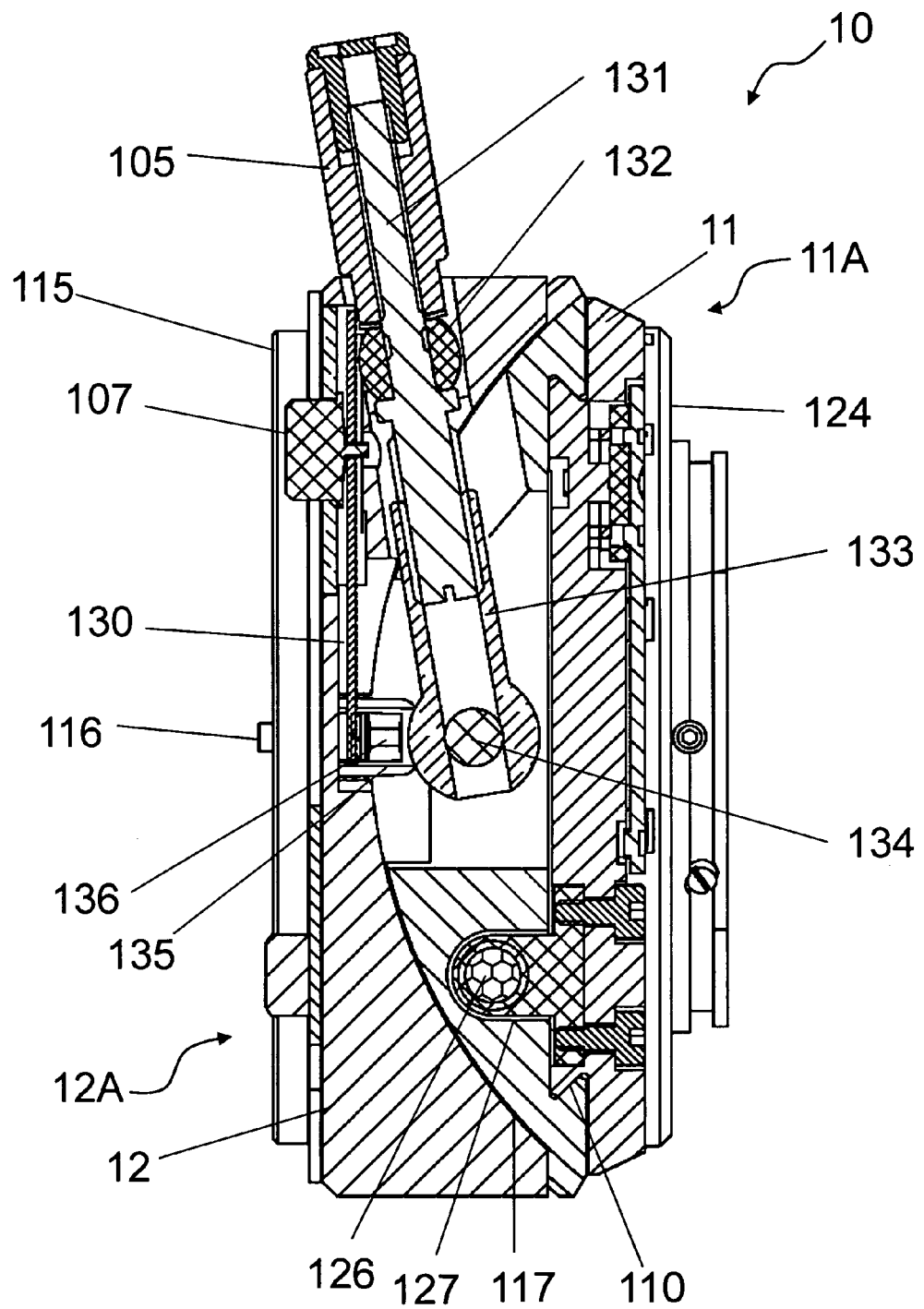
FIG. 11 is a cross-sectional, close-up view of the tilt shift adapter showing details related to the tilt mechanism.

FIG. 11 is a cross-sectional view of the adapter 10 that illustrates several mechanisms, including the tilt drive lead screw 131, the self-aligning tilt drive lead screw bearing 132, the self-aligning tilt drive nut 133, the rotation bearing for the self aligning tilt drive nut 134, the lens lock pin sleeve 135, the bottom of the spring-loaded lens locking pin 136, the lens locking pin 116, the lens locking pin lever 130, the shift drive lead screw 126, the shift drive nut, 127, the cylindrical dovetail tilt guide 117, the linear dovetail shift guide 110, the first side flange (i.e., camera flange) 124, and the second side flange (i.e. lens flange) 115.

Figure 12:
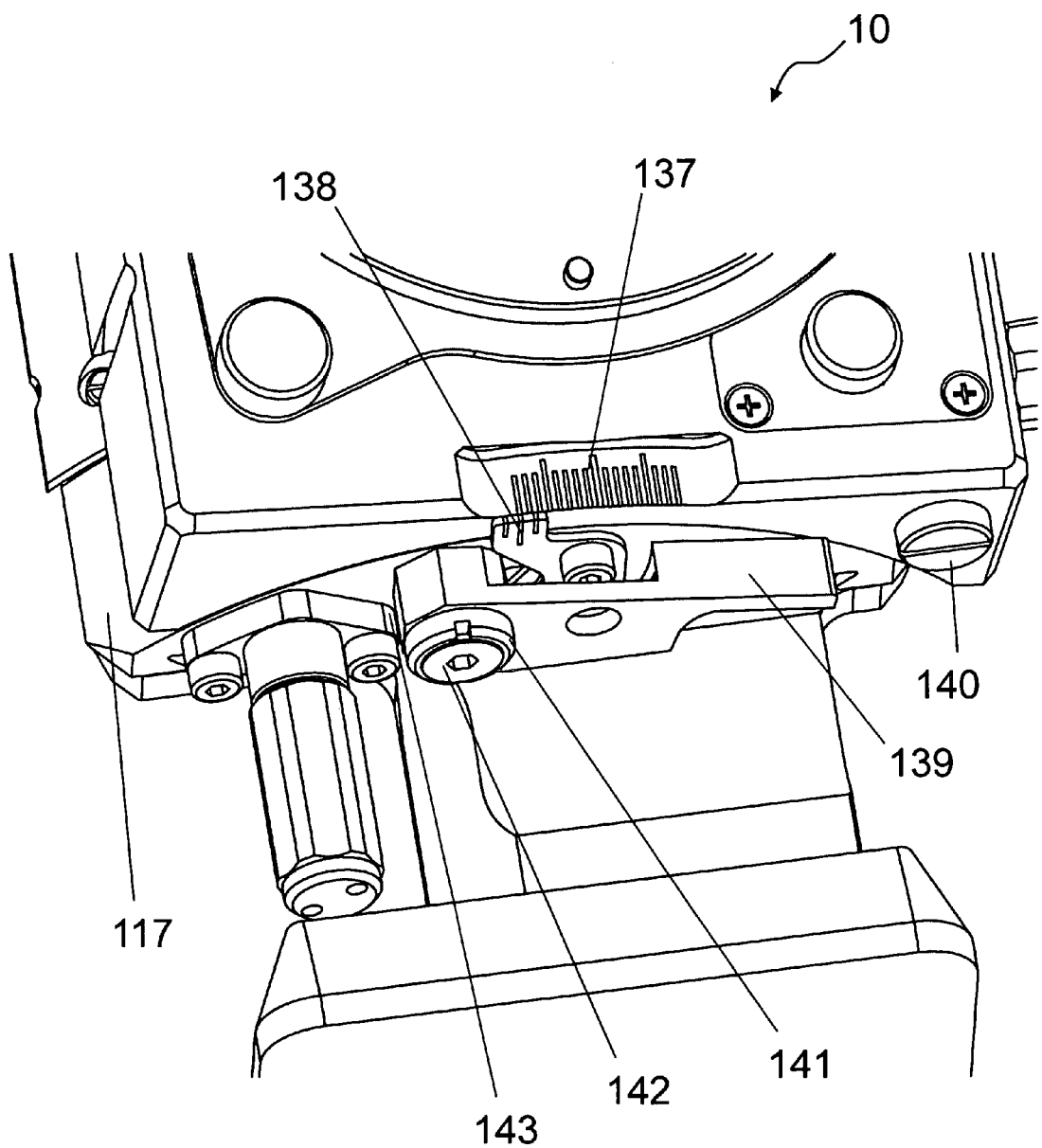
FIG. 12 is a close-up elevation view of an embodiment of the tilt shift adapter showing details related to the neutral setting of the tilting mechanism.

FIG. 12 is a detail view of the second side showing details related to the neutral setting of the tilt mechanism. This mechanism is important because it provides a precise and repeatable means for making the second flange 115 parallel to the first flange 124. This setting will be used very often in photography when no tilt adjustment is desired. The tilt scale 137 reads an angle (e.g., one degree) for each tic mark. The vernier index line 138 for the tilt scale permits tilt readings to within a finer angle, such as 0.5 degrees. A tilt lead screw bearing cover 140 also serves as a zero position stop for a zero tilt lever 139. An eccentric sleeve bearing 149 is shown for the zero tilt lever 139. A countersunk sleeve bearing lock 142 is also shown. A zero tilt lever engagement stop 143 is used to position the zero tilt lever 139 in the proper position in order to engage the zero tilt lever stop 140.

Figure 13:
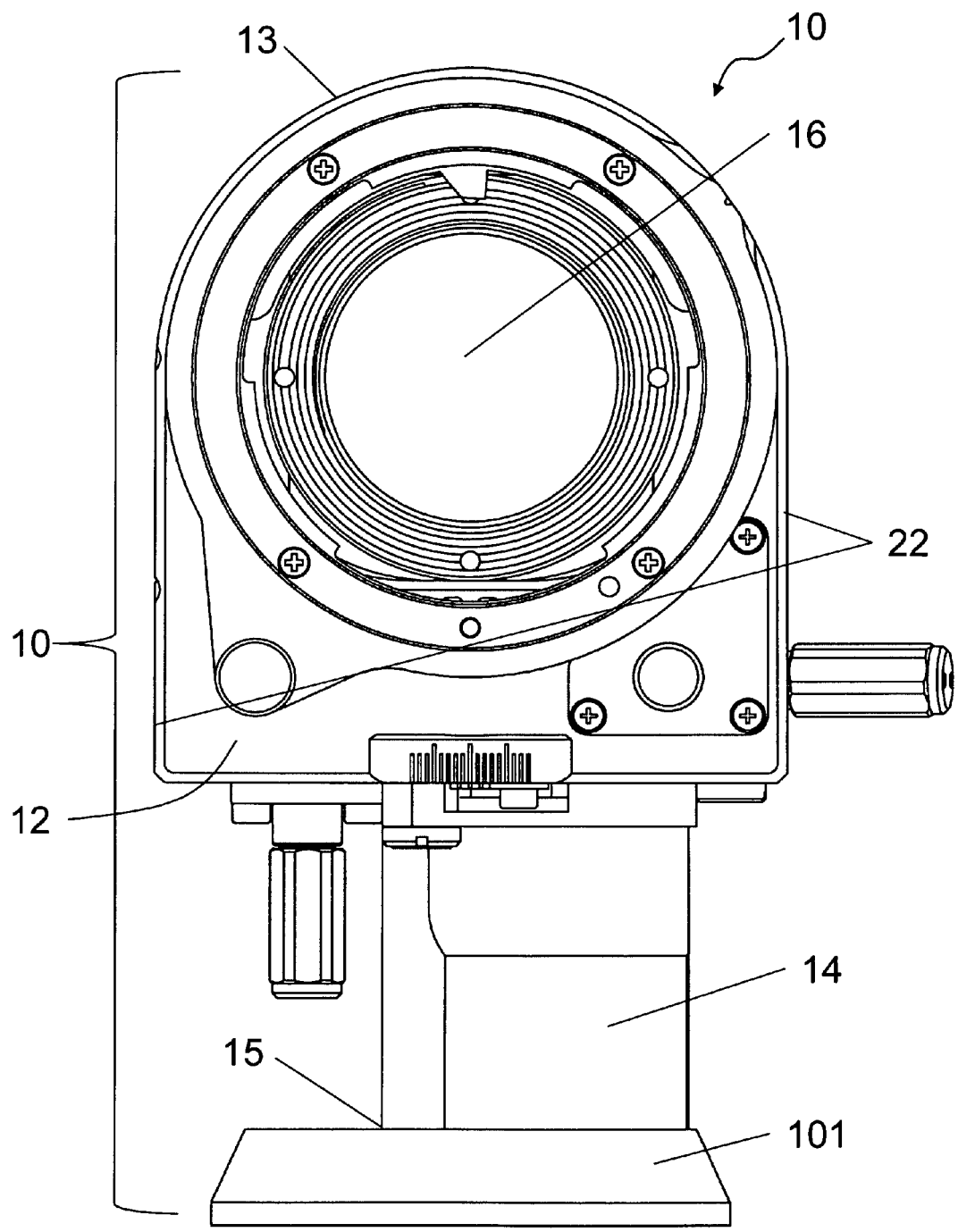
FIG. 13 is a face-on lens-side view of an embodiment of the tilt shift adapter illustrating the neutral position for both tilt and shift.

FIG. 13 is a view of the second side of the adapter 10 when set in a neutral position for both tilt and shift (i.e., zero tilt and zero shift). FIG. 13 shows the rounded top 13, parallel edges 22, extended body portion 14, bottom edge 15 of the extended body portion, along with mount 101.

Figure 14:
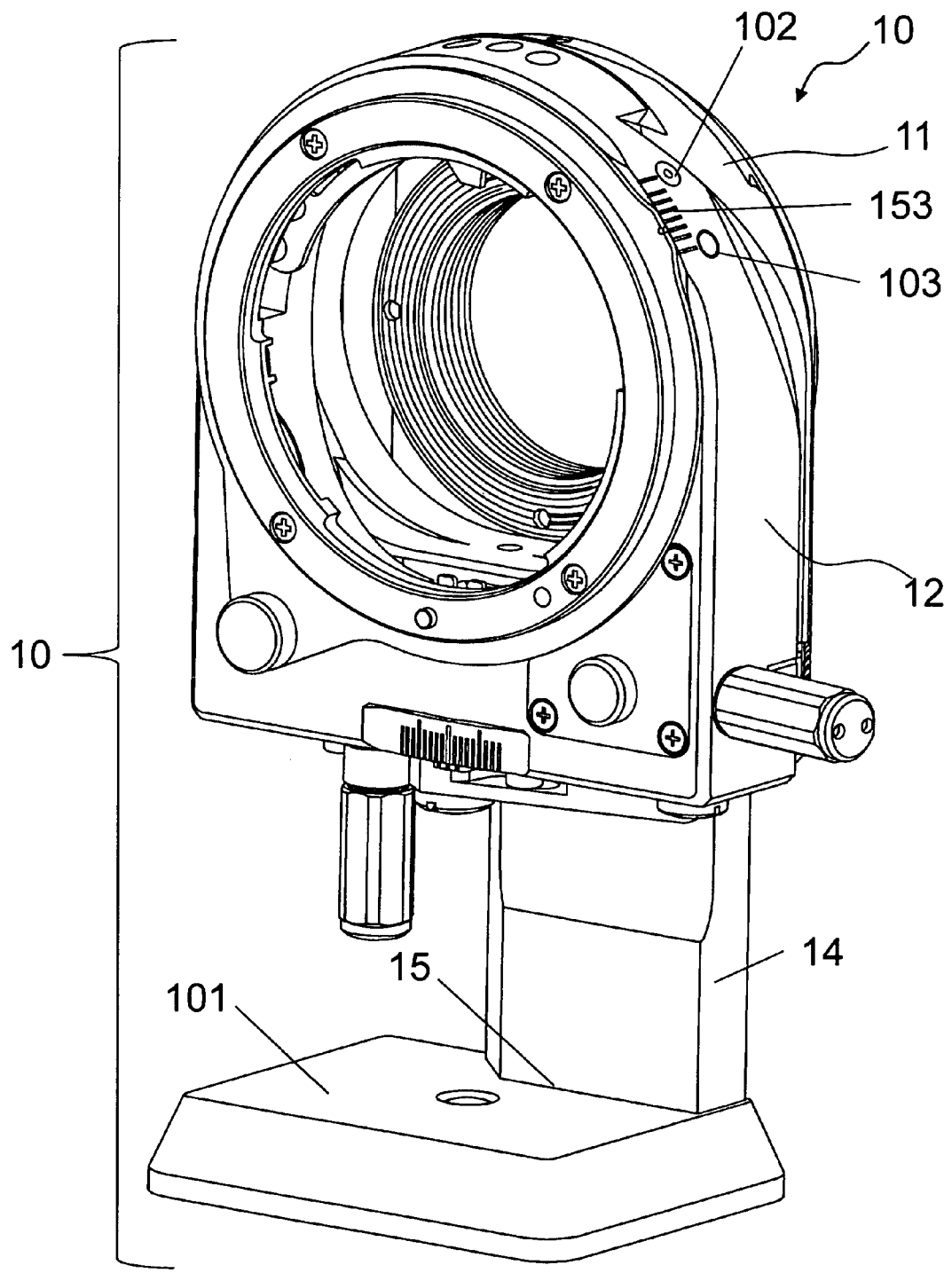
FIG. 14 is side elevation view of an embodiment of the tilt shift adapter showing the aperture indicator markings.

FIG. 14 illustrates the aperture open indicator 103 and closed indicator 102. The small central dot symbol 102 indicates the minimum aperture position, and the large central dot symbol 103 indicates the maximum aperture position. Indicator lines 153 show intermediate aperture values.

Figure 15:
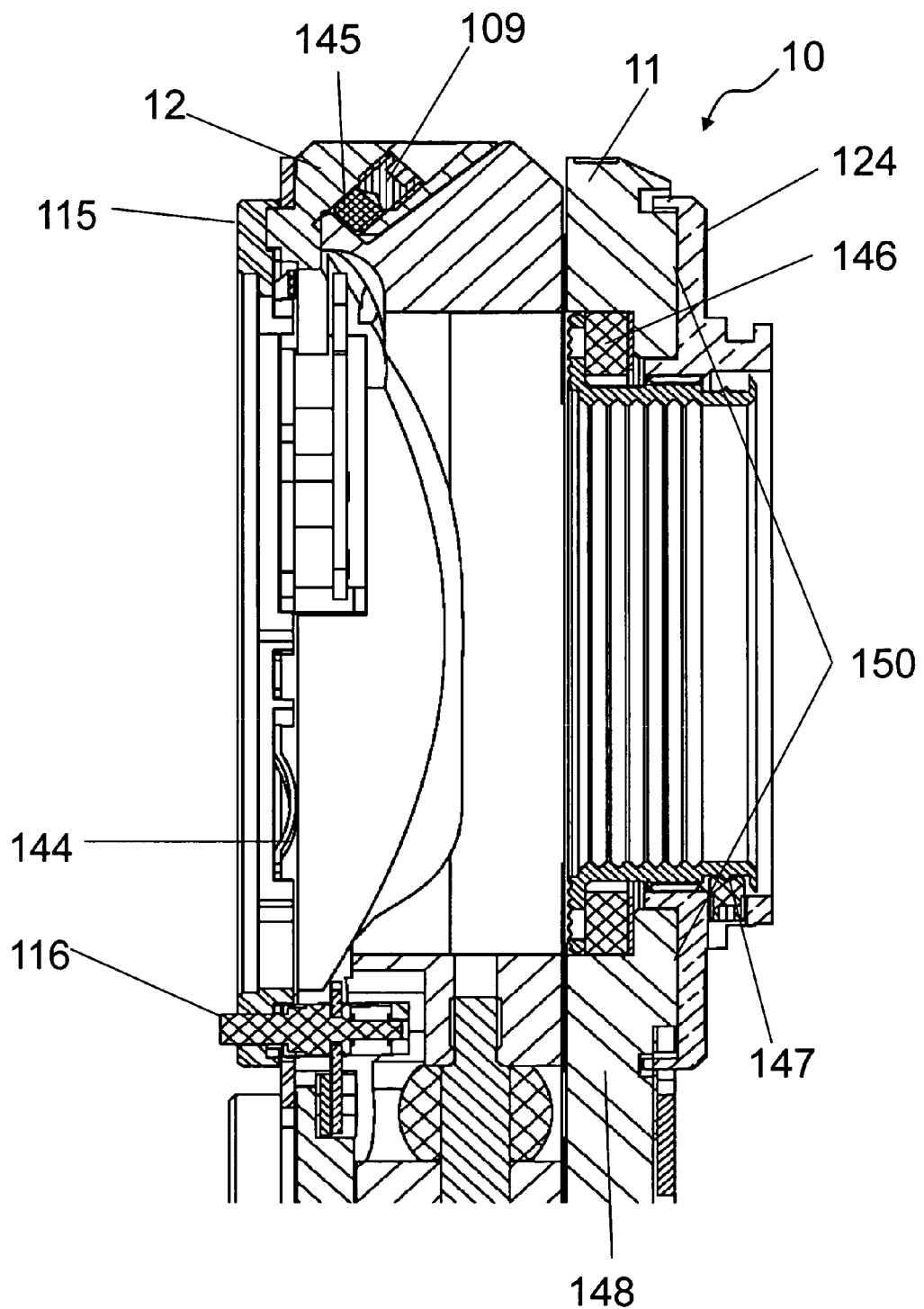
FIG. 15 is a close-up cross-sectional view of an embodiment of the tilt shift adapter showing details for a variety of mechanisms.

FIG. 15 illustrates a variety of additional mechanisms and features, including the lens locking pin 116, one of several lens bayonet springs 144 that provide a snug fit of the lens onto the second side flange 115, the slide adjustment bearing material 145 which provides a smooth sliding friction, one of the tilt movement adjustment screws 109, the compression spring 146 for adapter rotation, one of several set screws 147 to lock the inner ring of the adapter to the camera flange 124, the portion of the adapter body 148 that rotates relative to the camera flange when the adapter is rotated from landscape to portrait orientation (or vice versa), and the rotation bearing surface 150.

Figure 16:
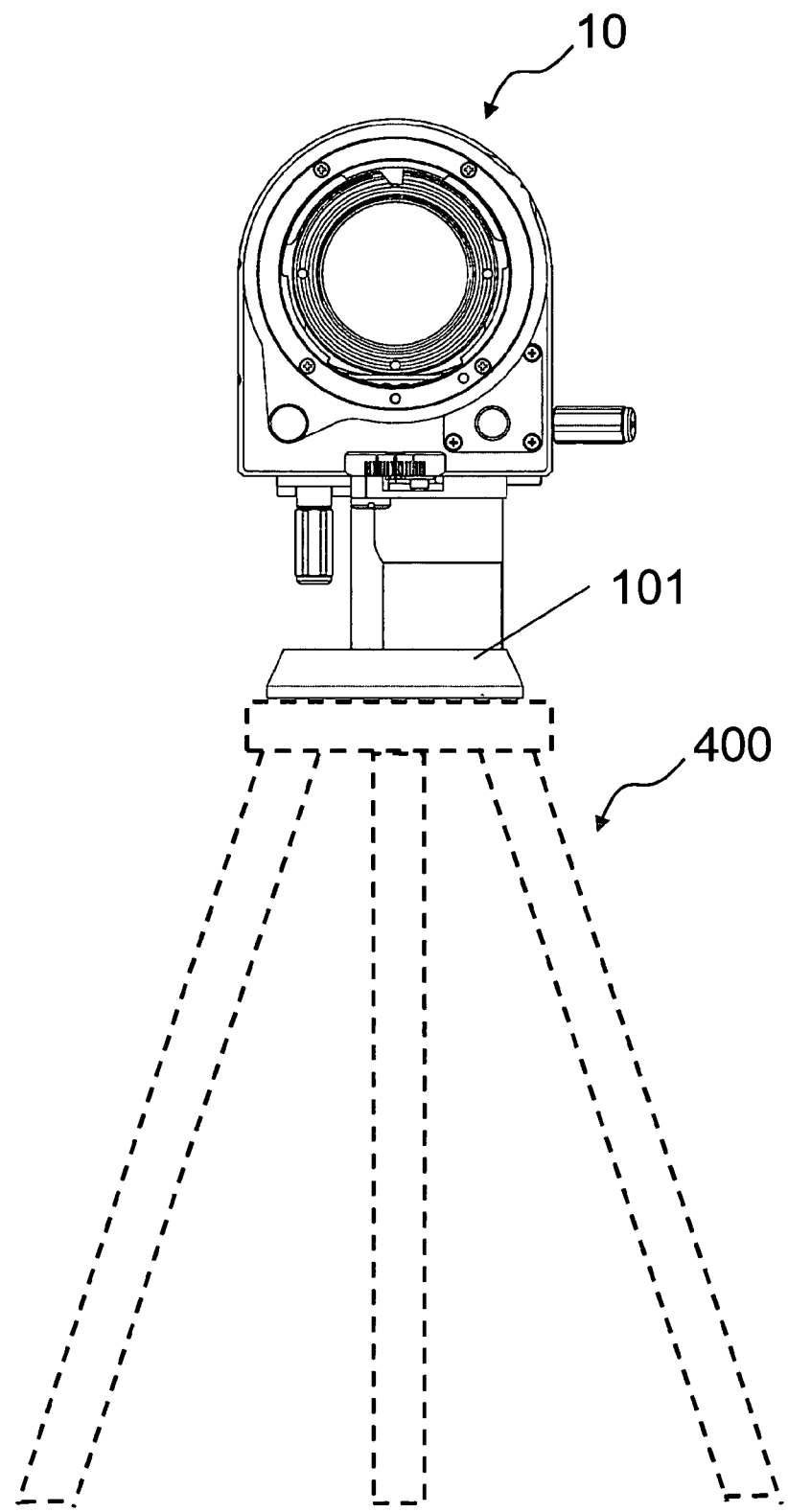
FIG. 16 shows an embodiment of the tilt shift adapter attached to an adapter body support.

FIG. 16 illustrates an adapter 10 according to the present invention attached to an adapter body support 400. In this figure the body support 400 is shown as a tripod, but in practice other types of supports may be used, such as a rigid pier, a clamp mounted to a pole, a beanbag support, or any other camera supporting means known in the art.

Figure 17:
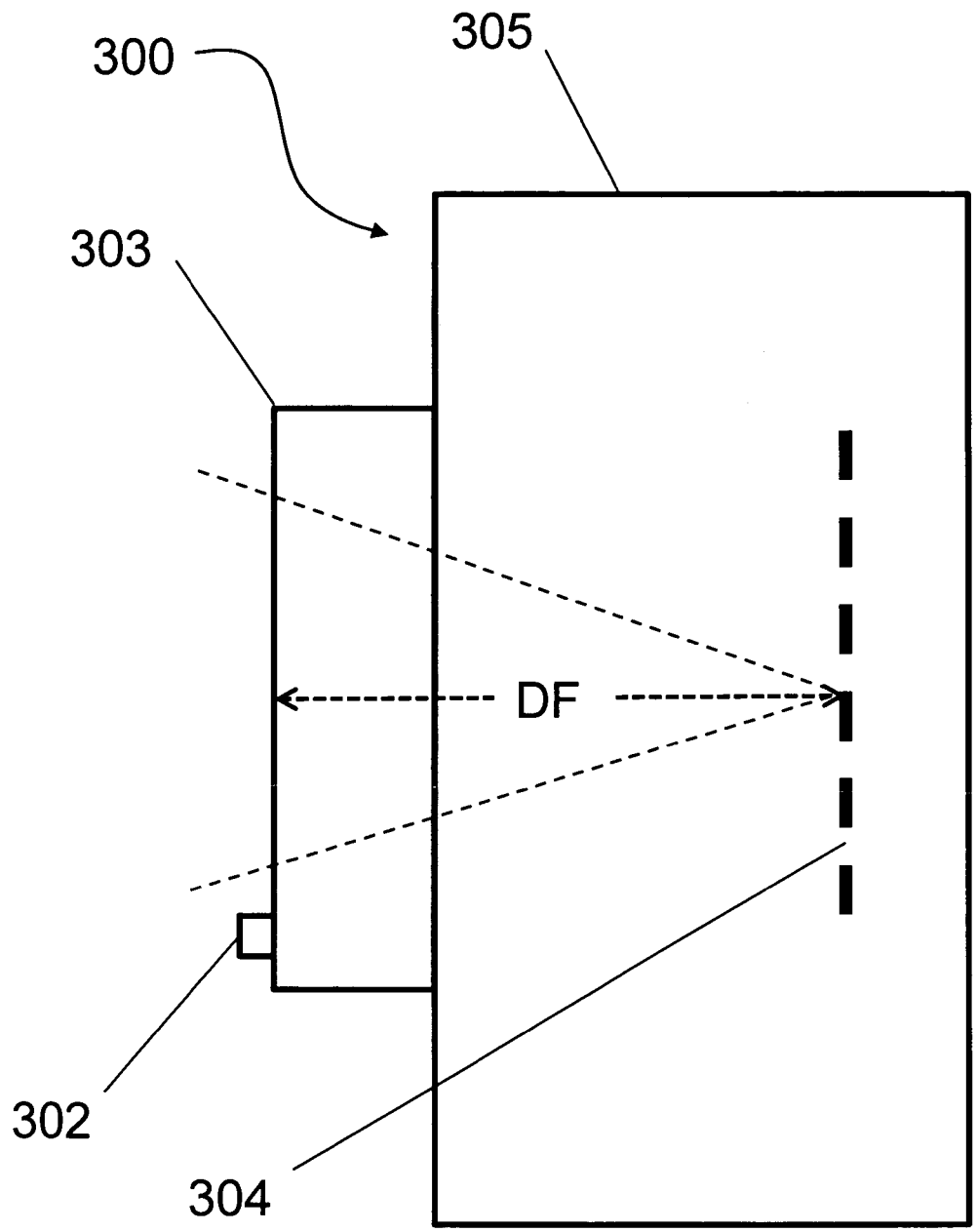
FIG. 17 is a schematic side view of a camera body with lens flange, lens mounting pin, and image plane.

FIG. 17 is a schematic drawing of a camera 300, including the camera body 305, lens flange 303, lens mounting pin 302, and image plane 304.

Thus, embodiments include a lens-to-camera mount adapter, referred to herein as a tilt shift adapter (or just "adapter"), with both tilting and shifting functions. In addition, the adapter has tilt and shift functions that are precisely controlled, e.g., by means of lead screws or the like. In addition, example adapters include means for direct attachment to a tripod or similar support. Example adapters also have means for manually controlling the aperture for certain attached lenses which lack a manual aperture control means, such as an aperture ring.

The example embodiments described above is suitable to adapt Nikon F-mount lenses onto Panasonic or Olympus Micro Four Thirds camera bodies. Since the flange distance DF (i.e., the distance from the lens mounting flange 303 on the camera body 305 to the camera image plane 304; see FIG. 17) of Micro Four Thirds cameras is 19.25 mm and the flange distance for Nikon F-mount lenses is 46.5 mm, the distance between the flange surfaces 115 and 124 of an embodiment is 27.25 mm. In addition, the example embodiment can provide manual aperture adjustment for Nikon "G" type lenses having an F-mount.

Many other embodiments fall within the scope of this disclosure. For example, in order to be compatible with Sony NEX series cameras having a flange distance (see FIG. 17) of 18 mm, the distance between the flange surfaces 115 and 124 would have to be increased by 1.25 mm relative to an adapter designed for Micro Four Thirds cameras. The adapter 10 may also be made compatible with lenses mounts other than the Nikon F-mount standard. Such lens mounts include but are not limited to Canon EOS, Sony Alpha, Pentax K, Olympus OM, Minolta Maxxum, M42, Yashica/Contax, and Leica R. Exemplary embodiments incorporating various different tripod adapters to fit different tripod heads are also fall within the scope of this disclosure. Such tripod heads include but are not limited to those manufactured by Arca-Swiss, Manfrotto, and Gitzo.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A tilt shift adapter for attaching a long-working-distance lens having a lens flange distance to a short-flange-distance mirrorless camera having a camera flange distance, comprising:

an adapter body having an aperture and a first body portion with a first side configured to attach the camera and second body portion with a second side configured to attach the lens, wherein the first and second body portions can move relative to one another to create a tilt and a shift relative to the first and second sides, and wherein the adapter body contains no lens elements and is sized to accommodate a difference between the lens flange distance and the camera flange distance;

a precision shifting mechanism operably configured to control and set an amount of said shift; and a precision tilting mechanism operably configured to control and set an amount of said tilt.

2. The adapter of claim 1, wherein the precision shifting mechanism and the precision tiling mechanism respectively include respective leadscrews with respective knobs.

3. An adapter according to claim 1, wherein the lens has an adjustable aperture and the adapter further comprising an aperture control mechanism configured to control the lens aperture.

4. An adapter according to claim 3, wherein the aperture control mechanism includes detents arranged to correspond approximately to single-stop changes in an aperture value.

5. An adapter according to claim 3, further comprising at least one of
 a) a visual indicator configured to indicate an aperture value of the adjustable aperture; and
 b) index marks arranged to indicate the amount of tilt and shift.

6. An adapter according to claim 1, further comprising a precision rotation mechanism configured to allow both portrait and landscape orientations of the camera, including at least one position therebetween.

7. An adapter according to claim 6, further comprising means for ensuring that the rotations do not interfere with successfully mounting or unmounting the adapter from either the camera or the lens.

8. An adapter according to claim 1, further comprising a mount configured to engage with an adapter body support.

9. An adapter according to claim 1, wherein the lens and camera have respective flanges and further comprising means for precisely returning the tilt mechanism to a neutral position in which the lens and camera flanges are parallel.

10. An adapter according to claim 1, further comprising at least one of the camera and the lens operably attached thereto.

11. A tilt shift adapter for attaching a lens having a lens flange distance to a camera having a camera flange distance that is shorter than the lens flange distance, comprising:

an adapter body with an aperture and having a first portion with a first side configured to operatively engage the camera and a second portion with a second side configured to operatively engage the lens, wherein the adapter body contains no lens elements and is sized to accommodate the difference between the lens and camera flange distances;

wherein the first and second adapter body portions are configured to be shiftable and tiltable relative to one another via respective shifting and tilting mechanisms operatively arranged with the adapter body portions; and a mount configured to attach the adapter body to an adapter body support.

12. An adapter according to claim 11, wherein the lens has an adjustable aperture, the adapter further comprising an aperture control mechanism configured to control the lens aperture.

13. An adapter according to claim 12, wherein the aperture control mechanism includes detents arranged to correspond approximately to single-stop changes in an aperture value.

14. An adapter according to claim 13, further comprising at least one of:

a) a visual indicator configured to indicate an aperture value of the adjustable aperture; and
b) index marks arranged to indicate an amount of tilting and shifting.

15. An adapter according to claim 11, further comprising a rotation mechanism configured to allow both portrait and landscape orientations of the camera, including at least one position therebetween.

16. An adapter according to claim 15, further comprising means for ensuring that the rotations do not interfere with successfully mounting or unmounting the adapter from either the camera or the lens.

17. An adapter according to claim 11, further comprising adjustment screws configured to eliminate play in at least one of the tilting and shifting mechanisms.

18. An adapter according to claim 11, wherein the lens and camera have respective flanges and further comprising means for precisely returning the tilt mechanism to a neutral position in which the lens and camera flanges are parallel.

19. An adapter according to claim 11, wherein the mount is configured to attach to different types of tripods.

20. An adapter according to claim 11, further comprising at least one of the camera and lens operably attached thereto.

* * * * *